(12) United States Patent
Uppal

(10) Patent No.: US 8,499,847 B2
(45) Date of Patent: Aug. 6, 2013

(54) LANDING PAD WITH A BUILT-IN FIRE SUPPRESSOR

(75) Inventor: Neelesh Uppal, Singapore (SG)

(73) Assignee: Aluminium Offshore PTE. Ltd., Singapore (SG)

( * ) Notice: Subject to any disclaimer, the term of this patent is extended or adjusted under 35 U.S.C. 154(b) by 0 days.

(21) Appl. No.: 13/141,069

(22) PCT Filed: Dec. 22, 2008

(86) PCT No.: PCT/SG2008/000496
§ 371 (c)(1),
(2), (4) Date: Aug. 18, 2011

(87) PCT Pub. No.: WO2010/074653
PCT Pub. Date: Jul. 1, 2010

(65) Prior Publication Data
US 2011/0290509 A1    Dec. 1, 2011

(51) Int. Cl.
A62C 37/08 (2006.01)
A62C 3/00 (2006.01)
A62C 35/00 (2006.01)
B64F 1/00 (2006.01)
E01F 3/00 (2006.01)

(52) U.S. Cl.
USPC ............... 169/62; 169/37; 169/54; 244/114 R

(58) Field of Classification Search
USPC ............................ 169/37, 54, 62; 244/114 R
See application file for complete search history.

(56) References Cited

U.S. PATENT DOCUMENTS

| | | | |
|---|---|---|---|
| 3,063,502 A * | 11/1962 | Lakind | 169/54 |
| 4,202,646 A * | 5/1980 | Herstad | 404/36 |
| 4,474,130 A * | 10/1984 | Birkeland | 114/258 |
| 4,657,086 A * | 4/1987 | Aanensen | 169/54 |
| 4,665,857 A | 5/1987 | Akerman et al. | |
| 4,836,472 A * | 6/1989 | Sutter et al. | 244/114 R |
| 5,351,915 A | 10/1994 | Aandalen | |
| 5,367,973 A | 11/1994 | Heggertveit | |
| 6,481,644 B1 | 11/2002 | Olsen | |
| 7,484,589 B2 | 2/2009 | Guo | |

FOREIGN PATENT DOCUMENTS

| | | |
|---|---|---|
| DE | 4006962 A1 | 9/1991 |
| GB | 2414973 A | 12/2005 |
| KR | 1982-0001625 A | 9/1982 |
| MX | 168905 | 10/1987 |

(Continued)

OTHER PUBLICATIONS

WO 97/34658, Braithwaite, Sep. 25, 1997.*

(Continued)

Primary Examiner — Ryan Reis
(74) Attorney, Agent, or Firm — John S. Economou

(57) ABSTRACT

A landing pad with an inbuilt fire suppressor that includes at least one first interlocking unit. The interlocking unit includes a landing surface, wherein the landing surface includes openings distributed thereon; and at least one interlocking mechanism located along its periphery. The interlocking mechanism is adapted to interconnect with a corresponding interlocking mechanism from another interlocking unit. A hollow chamber is located beneath the landing surface such that the hollow chamber is in fluid communication with the openings. A heat conductive layer is arranged to span across the hollow chamber thereby subdividing the hollow chamber into an upper section and a lower section. The upper section is in fluid communication with the openings. The heat conductive layer is adapted to dissipate heat from a localized point thereon to over the entire heat conductive layer.

21 Claims, 6 Drawing Sheets

(56) References Cited

FOREIGN PATENT DOCUMENTS

| WO | 8600274 | A1 | 1/1986 |
| WO | 8805481 | A1 | 7/1988 |
| WO | 9734658 | A1 | 9/1997 |

OTHER PUBLICATIONS

International Search Report, PCT/SG2008/000496, Mar. 23, 2009.

Korean Patent Search Report (with translation).

* cited by examiner

LANDING PAD WITH A BUILT-IN FIRE SUPPRESSOR

This application is a U.S. national stage application of International Application No. PCT/SG2008/000496 which was filed Dec. 22, 2008 and published in English as WO 2010/074653 A1 and WO 2010/074653 A9 (corrected version). The disclosure of the above application is incorporated herein by reference.

The present invention relates to a landing pad, in particular, to a landing pad with a built-in fire suppressor.

Landing pads are commonly found in airports; on the top of high-rise buildings; and in particular, on marine vessels such as oilrigs and ships, for example. They are primarily utilized by helicopters, and in some instances, by vertical take-off and landing (VTOL) aircraft. Typically, a basic landing pad includes a smooth support surface on which an aircraft lands. The landing pads in airports may be made from steel decks, wooden decks or bitumen, for example, while the landing pads in oil rigs and ships are typically made from steel or aluminium, as opposed to wood, since wood presents a greater fire hazard in the event of an onboard fire.

The aforesaid basic landing pads, regardless of whether they are land-based or sea-based, are nonetheless susceptible to damage in the event of an ignition of aviation fuel. In this respect, aviation fuel may be spilt over a landing pad as a result of negligence during a refuelling process or in the event of an aircraft crashing on the pad itself. As aviation fuel typically burns at approximately 1100° C., burning aviation fuel impose greater danger to people on the landing pad or on board of an aircraft and, in addition, easily causes severe structural damage to landing pads of the above-mentioned basic design as there is no fire suppression or fire retardation means provided with these basic landing pads. For example, when a fire breaks out on a basic landing pad as described above, the fire service (local or airport) is usually relied on to extinguish the fires. However, as the ignition of aviation fuel is a sudden and violent event, usually the time taken for the fire services to respond is too long to prevent significant damage from taking place to the landing pad. In the case of a marine vessel, a fire on its basic landing pad could easily spread to the rest of the vessel resulting in catastrophic consequences.

To overcome the aforesaid difficulty, U.S. Pat. No. 4,836, 472 discloses a landing pad that includes a passive fire-fighting system. Extruded aluminium beams on a base support an upper platform for supporting an aircraft. The support aluminium beams provide a space between the base and the upper platform. The upper platform is a grating, which permits fuel to pass through it. The support beams also support strips of high-heat conductive material below the upper platform. Between the strips of conductive material are deck plates. The conductive material conducts localized heat from one location thereon to another location to give a more even temperature spread across the conducting strips. The deck plates catch fuel that passes through the conducting strips and causes the fuel to flow away from the deck. However, in the event that the upper platform is on fire, there is no means provided for suppressing such a fire.

In yet another attempt to overcome the aforesaid difficulties in extinguishing aviation fuel based fires, U.S. Pat. No. 6,481,644 B1 discloses an active fire-fighting device. The device is a sprinkler that may be used in conjunction with the landing pads, as described earlier. However, such a sprinkler device on its own requires the use of a foam retardant chemical to put out aviation fuel fires and cannot solely rely on using water or seawater to extinguish such fires, which would be the most readily available source of fluid for sea-going vessels such as oilrig platforms and ships.

As such, despite the above-mentioned attempts at providing a landing pad with adequate fire hazard suppression, there still exists a need for a landing pad that is efficient in fire hazard suppression, portable, scalable in size and cost-effective to produce. Such a landing pad, as defined in the claims appended below, overcomes the above-mentioned difficulties.

The landing pad of the present invention includes at least one first interlocking unit. The interlocking unit includes a landing surface, wherein the landing surface has openings distributed thereon. The landing surface of the interlocking unit also includes at least one interlocking mechanism located along its periphery. The interlocking mechanism is adapted to interconnect with a corresponding interlocking mechanism from another interlocking unit. A hollow chamber is located beneath the landing surface such that the hollow chamber is in fluid communication with the landing surface via the openings distributed thereon. In this context it is noted that the landing pad of the present invention allows for the first time plain water to be used an extinguishing medium for hydrocarbon based (fuel based) fire. This is in particular advantageous as usually water only exacerbates a hydrocarbon based fire causing it to spread even further. Thus, the use of water as the only fire extinguishing means in connection with a landing pad is also contemplated in the present invention. In this context is it also noted that the built-in fire suppressor of the landing deck can serve the purpose to either suppress or retard (the development) of a fire (in case the fire is not completely eliminated or also the purpose to eliminate or extinguish the fire completely, usually in connection with the use of water and/or another fire extinguishing medium.

A heat conductive layer is arranged within the hollow chamber such that it spans across the hollow chamber thereby subdividing the hollow chamber into an upper section and a lower section. The upper section is in fluid communication with the landing surface via the openings while the lower section is in fluid communication with the upper section via the heat conductive layer. The heat conductive layer that sub-divides the hollow chamber is adapted to dissipate heat from a localized point thereon to over the entire heat conductive layer. This creates a more even temperature spread over the heat conductive layer such that any localized heat source, such as those from burning aviation fuel for example, is dissipated rapidly.

In one embodiment, the interlocking unit may also include at least one sprinkler nozzle located proximate to the landing surface of the at least one interlocking unit. The sprinkler nozzle is connected to a fluid reservoir and is adapted to emit a spray of fluid over the entire landing surface when activated.

In one embodiment of the landing pad, the at least one interlocking mechanism located along the periphery of the landing surface is complementary in shape to the corresponding interlocking mechanism to which it is adapted to interconnect to. In other words, a mechanism similar to that of a plug and socket mechanism may be used. In one particular embodiment of the interlocking mechanism, the complimentary shaped interlocking mechanism is adapted to receive and interconnect with the corresponding interlocking mechanism such that the landing surface remains planar. This ensures that there are no, or minimal, protrusions along the landing surface of the landing pad.

Returning to the heat conductive layer that spans across the hollow chamber, said heat conductive layer typically is or includes a finely meshed gauze. This meshed gauze can either comprise a plurality of layer (i.e. two or more, for example up to about a hundred layers) or can also consist of a single layer (single layer gauze). The finely meshed gauze, regardless of being a single layer gauze or comprising a plurality of layers, may be fabricated from any heat conductive material, for example, a conductive metal, metal alloy or carbon fibre. Suitable (metallic) materials include, but are not limited to copper, stainless steel or aluminium, for example. The mesh size of this gauze (which can also be considered to be a perforated screen) is chosen such that it allows the burning fuel to be dispersed into smaller droplets ("atomized") when the fuel drops through the gauze. For this purpose, the mesh size is typically chosen to be in the millimeter range, depending on the octane rating of the fuel. The higher the octane rating of the fuel is, typically the finer the mesh size is in order to dissipate the fuel/the energy associated with the higher octane rating. In illustrative embodiment the mesh size of the gauze can be in the range of about 0.01 mm to about 2.5 mm or in the range of about 0.04 mm to 1.9 mm. The thickness of the (single layer) mesh may also be chosen depending on the octane rating of the fuel, and can for example be in the millimeter range, for example between 0.5 mm to 2.0 mm or 0.7 mm to 1.6 mm. The finely meshed gauze is usually held in a frame which gives the gauze rigidity and allows it to be slid into a tight fit inside the interlocking unit. This frame is usually made of a material such as stainless steel to prevent corrosion. No other parts are required for mounting the gauze. The gauze can be continuous, wherein the frame allows the gauze to be joined (similar to a picture frame) to allow continuity without gaps.

The use of a finely meshed gauze increases the area of contact between the heat conductive layer and any flammable liquid flowing into the hollow chamber from the landing surface. This allows the heat conductive layer to cool the flammable liquid by rapidly dissipating heat from it. This is especially important in the situation where the flammable liquid is burning as it enables the fire to be put out more easily. Furthermore, once the fire is put out, the use of the finely meshed gauze also permits the then cooled flammable liquid to flow on into the lower chamber for further processing as described later on below.

Turning now to the sprinkler nozzle, said sprinkler nozzle may be integrally located within each interlocking unit such that it lies along the central axis or rotation of said interlocking unit. This arrangement may be used in the case where each interlocking unit is sufficiently large such that it requires its own corresponding sprinkler nozzle, or as in the case where merely one or two interlocking units are used to form the entire landing pad.

In an alternative embodiment, the at least one sprinkler nozzle may be located adjacent to the periphery of at least two interconnected interlocking units. In this embodiment, the sprinkler nozzle is equidistant from the centres of rotation of the respective at least two interlocking units. This arrangement of the sprinkler nozzle may be used where the interlocking units used to form the landing pad are of a smaller size such that the discharge from a single sprinkler nozzle centrally located with respect to the two or more adjacent interlocking units is sufficient to douse all the interlocking units. In this and all other embodiments, it should be noted that the sprinkler nozzle extends up to the landing surface of the interlocking units such that a relatively flat and planar landing surface is achieved. In other words, the sprinkler nozzle does not protrude intrusively into the plane of the landing surface.

In one exemplary embodiment, the sprinkler nozzle may be secured to the underside of the landing surface of the interlocking unit. Depending upon the operational theatre of the landing pad, the sprinkler nozzle may be connected to a seawater fluid reservoir, fresh water fluid reservoir or a foam fluid reservoir, for example.

In all the embodiments described herein, the lower section of the hollow chamber is adapted to collect and drain away fluid received from the landing surface via the heat conductive layer. The drained fluid may include a mixture (immiscible or miscible) of flammable liquid and a flushing medium from the spray emitted by the sprinkler nozzle. The flammable liquid may be aviation fuel or any other combustible liquid while the flushing medium is typically water, seawater or foam, for example. As such, the lower section of the hollow chamber may include a device for separating and/or purifying the drained flammable liquid in order that it may be recycled.

The landing pads of the various embodiments described herein may also include a porous or grated safety net arranged over the landing surface. The safety net may take any shape, be it a regular or irregular shape. Examples of regular shapes include a circular shape or a polygonal shape such as an octagon, a square, a pentagon or a hexagon, for example. Where the landing pad includes such a safety net, said safety net serves the purpose of forming an additional homogeneous surface over the landing surface(s) of the interlocking unit(s) and may be used to create a non-skid surface for the aircraft wheels.

In a further embodiment of the invention, the landing pad may include at least one second interlocking unit. The second interlocking unit is identical to the first interlocking unit, and interconnects with the interlocking mechanism of the first interlocking unit. In doing so, the landing surface of the at least one first interlocking unit and the landing surface of the at least one second interlocking unit combine to form an enlarged landing surface. This embodiment may be employed in situations where it is difficult to transport a single large interlocking unit to form the landing pad. Instead, multiple (two or more) smaller and more portable interlocking units may be used in combination with each other, as described above, to form the landing pad.

The at least one first interlocking unit and the at least one second interlocking unit are typically fabricated from metal. The metal can, for example, be selected from the group consisting of aluminium, titanium, stainless steel or alloys thereof. In one embodiment, the metal or metal alloy is non-corrosive.

In one illustrative embodiment, the landing pad with a built-in fire suppressor includes a central interlocking unit. The central interlocking unit is identical to the interlocking units described above and includes a landing surface, wherein the landing surface has openings distributed thereon. The interlocking unit also has at least one interlocking mechanism located along its periphery, said interlocking mechanism being adapted to interconnect with a corresponding interlocking mechanism. The interlocking unit has a hollow chamber located beneath the landing surface. The hollow chamber is in fluid communication with the openings. A heat conductive layer is arranged to span across the hollow chamber thereby subdividing the hollow chamber into an upper section and a lower section, wherein the lower section is in fluid communication with the upper section via the heat conductive layer, and wherein the heat conductive layer is adapted to dissipate heat from a localized point thereon to over the entire heat conductive layer.

The landing pad of this illustrative embodiment also includes six peripheral interlocking units identical to the central interlocking unit. However, in other embodiments, three, four or even seven or more peripheral interlocking units may be used, for example. The six peripheral interlocking units interconnect, via their respective interlocking mechanisms, with the central interlocking unit such that the peripheral interlocking units are evenly distributed around the central interlocking unit thereby combining to form an enlarged substantially planar landing surface.

In one example of this illustrative embodiment, the landing pad further includes at least one sprinkler nozzle located proximate to the landing surface of the central and peripheral interlocking units. The sprinkler nozzle is connected to a fluid reservoir and said sprinkler nozzle is adapted to emit a spray of fluid over the enlarged substantially planar landing surface.

In another example of the illustrative embodiment, the at least one sprinkler nozzle is integrally located within and substantially along the central axis of rotation of the central and peripheral interlocking units and extends up to the landing surface of each of the respective interlocking units. In yet another example of the illustrative embodiment, the at least one sprinkler nozzle is located adjacent to the periphery of the central interlocking unit and at least one of the peripheral interlocking units such that the sprinkler nozzle is substantially equidistant from the centres of rotation of the central interlocking unit and the at least one peripheral interlocking unit, and wherein that the sprinkler nozzle extends up to the landing surface of each of the respective interlocking units.

The following illustrations and accompanying description serve to further aid in the clarity and understanding of the invention. However, it should be noted that the scope of the invention is by no means limited to the various exemplary embodiments illustrated hereafter.

Figure 1:
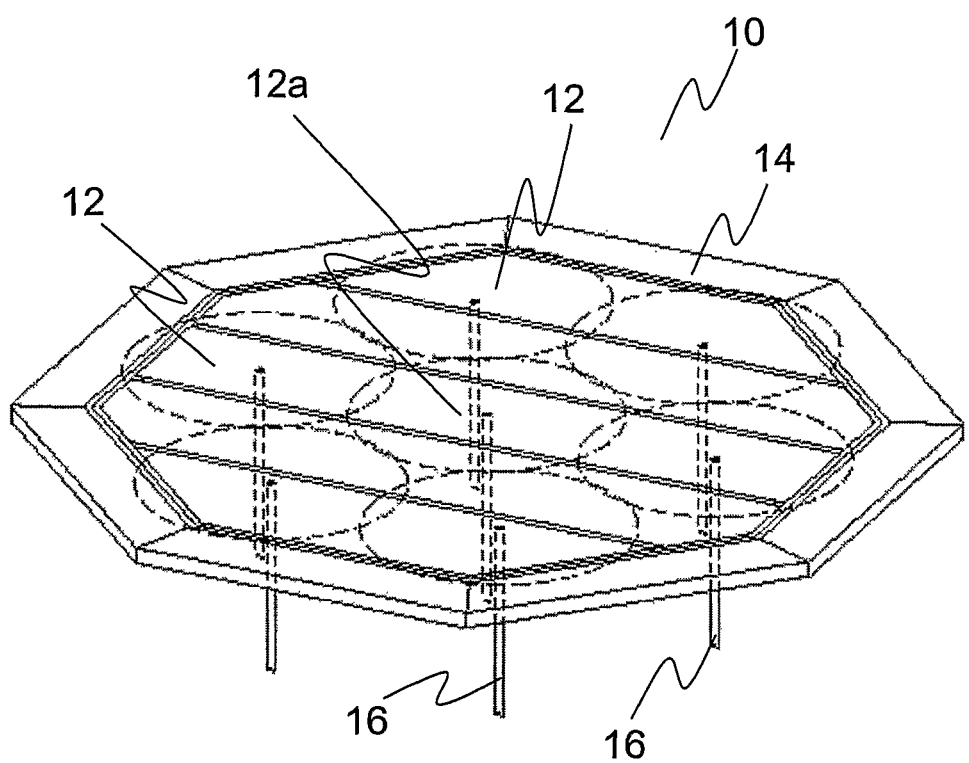
FIG. 1 is a perspective view of an exemplary embodiment of a landing pad.

FIG. 1 is a perspective view of an exemplary embodiment of a landing pad 10. In this exemplary embodiment, the landing pad 10 includes seven interlocking units 12. Each interlocking unit 12 has a landing surface that is described in detail later below. The interlocking units 12 are assembled such that one central interlocking unit 12a is surrounded with the remaining six interlocking units 12. The landing surface of each interlocking unit 12 combines with its adjacent interlocking unit 12 to form a collective landing surface of the landing pad 10.

In the centre of each interlocking unit 12 is a sprinkler nozzle 16. The sprinkler nozzle 16 located beneath the interlocking units 12 is connected to a fluid reservoir system (not shown). The tip of the sprinkler nozzle 16 extends up to the surface of the landing pad 10. The tip does not protrude into the plane of the landing surface thereby allowing the landing surface to retain its generally planar surface. A safety net 14 is further arranged over the landing surface formed collectively by the seven interlocking units 12. The safety net 14 shown in FIG. 1 is of octagonal shape. However, as mentioned before, the safety net can adopt any regular or irregular shape.

Figure 2:
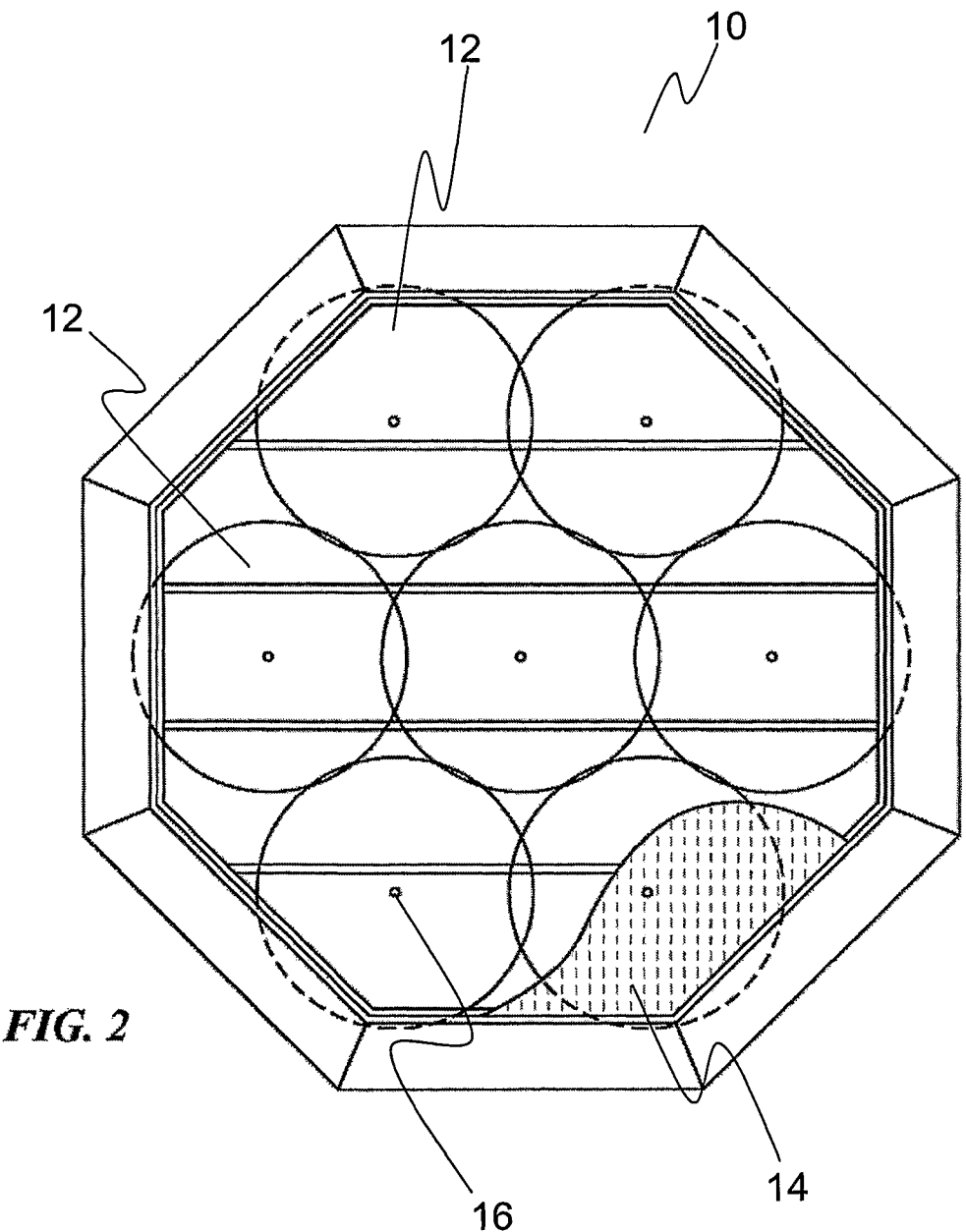
FIG. 2 is a top view of the landing pad of FIG. 1.

FIG. 2 is a top view of the landing pad of FIG. 1. As mentioned, the overall shape of the landing pad 10 in this exemplary embodiment is octagonal. In other exemplary embodiments, the shape of the landing pad may be of a different polygonal shape such as of tetrahedral, pentagonal square or hexagonal shape, for example.

Figure 3:
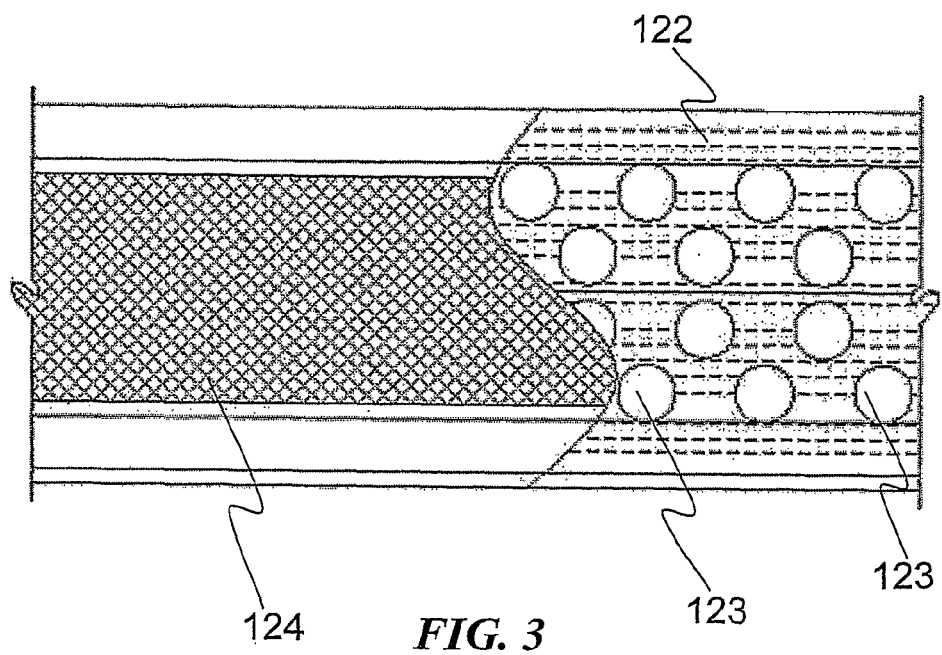
FIG. 3 is a top sectional view of the exemplary embodiment of FIG. 1.

FIG. 3 is a sectional view of the exemplary embodiment of FIG. 1 from the top. As mentioned, the interlocking unit 12 includes a landing surface 122. Dispersed over the landing surface 122 are numerous openings or holes 123. The holes 123 allow for fluid to pass through the landing surface 122, into the interlocking unit 12 and onto a porous or grated heat conductive layer 124, which is described in greater detail with respect to FIG. 4 below.

Figure 4:
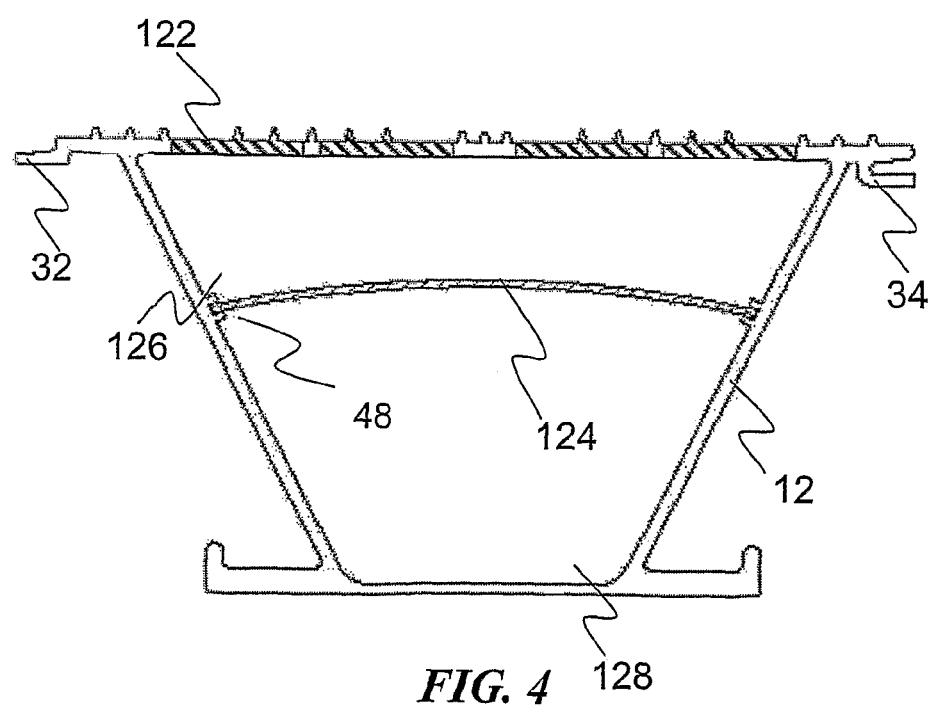
FIG. 4 is a cross-sectional view of another exemplary embodiment of an interlocking unit.

FIG. 4 is a cross-sectional view of an exemplary embodiment of an interlocking unit 12. In this exemplary embodiment of the interlocking unit 12, the sprinkler nozzle 16 is not shown. In this exemplary embodiment of the interlocking unit 12, the landing surface 122 has a pair of complementary interlocking mechanisms 32 and 34 located on its periphery. The interlocking unit includes a hollow chamber beneath the landing surface 122. The hollow chamber has the heat conductive layer 124 arranged therein such that said heat conductive layer 124 spans across the hollow chamber and subdivides the hollow chamber into an upper chamber 126 and a lower chamber 128.

The upper chamber 126 is in fluid communication with the openings 123 of the landing surface 122. Due to the fluid communication between the upper chamber 126 and the openings 123, fluid, such as water or fuel, for example, when dispersed on the landing surface 122, flows through the openings 123 and into the upper chamber 126. In the upper chamber 126, the fluid then comes into contact with the heat conductive layer 124 which acts to dissipate localized heat from the fluid to over the span of the entire heat conductive layer 124. The heat conductive layer may be a single layer gauze or mesh with a mesh size of about 0.01 mm to 2.5 mm and a thickness of about 0.5 mm to 2.0 mm. Also indicated in FIG. 4 is a frame 48 into which the gauze/heat conducive layer 124 is mounted by a tight fit mechanism.

Following the dissipation of localized heat by the heat conductive layer 124, the now cooled fluid further flows down into the lower chamber 128 via the porous or grated heat conductive layer 124. In the lower chamber 128, the fluid (which may be a mixture of aviation fuel and seawater, for example) is collected and may be subjected to separation and purification processes that may allow the aviation fuel to be recycled. In one embodiment, the collected aviation fuel may be routed to an oily water separator unit which may be situated below the landing pad 10, at a safe area.

Figure 5:
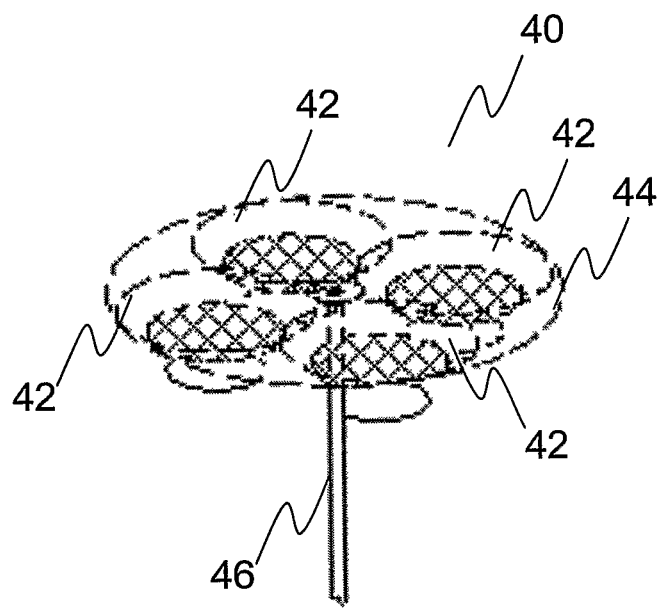
FIG. 5 is a perspective view of another exemplary embodiment of a landing pad that includes the interlocking unit of FIG. 4.

FIG. 5 is a perspective view of another exemplary embodiment of a landing pad 40 including the interlocking unit 42 similar to that of FIG. 4. In this exemplary embodiment, the landing pad 40 includes four of such interlocking units 42. It should be noted that depending on operational requirements, more than four interlocking units 42 may be used to form the landing pad 40. This exemplary embodiment also includes a sprinkler nozzle 46 centrally located between the four interlocking units 42 such that when activated, the sprinkler nozzle 46 emits a spray that covers the four interlocking units 42 that surround it. As in the previous embodiment of FIG. 1, the interlocking units are covered with an (optional) safety net 44 illustrated by broken lines.

Figure 6:
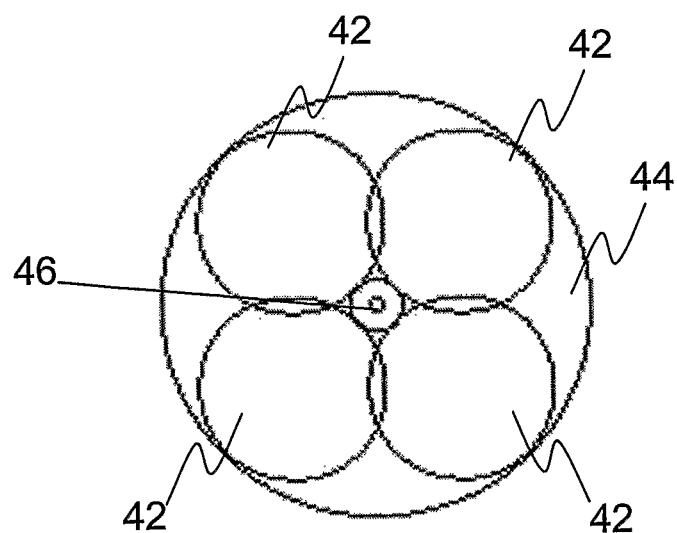
FIG. 6 is a top view of the landing pad of FIG. 5.

FIG. 6 is a top view of the landing pad of FIG. 5. From this view, the arrangement of the interlocking units 42 with respect to the sprinkler nozzle 46 can be better appreciated. As shown, each of the interlocking units 42 engages with two other interlocking units 42 and if necessary, with the sprinkler nozzle 46 as well. As in the previous exemplary embodiment, the sprinkler nozzle 46, in particular its head, does not protrude above the collective landing surface formed by the combination of the four interlocking units 42 thereby giving rise to a relatively flat collective landing surface covered by the safety net 44.

Figure 7:
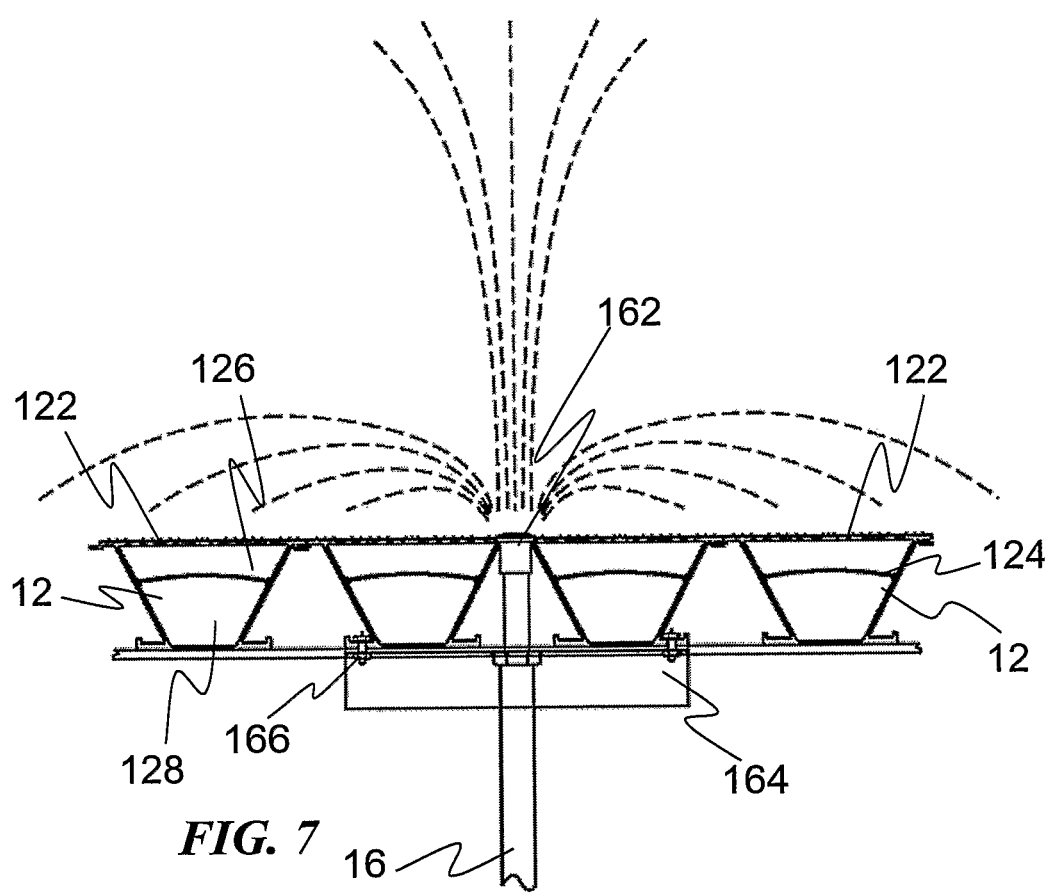
FIG. 7 is a cross-sectional view of an exemplary embodiment of the landing pad of FIG. 5.

FIG. 7 is a cross-sectional view of the exemplary embodiment of the landing pad of FIG. 5. In this embodiment, four interlocking units 12 are arranged in a line abreast arrangement. A sprinkler nozzle 16 is located between the two interlocking units 12 located in the middle of said line abreast arrangement. A sprinkler control unit 164 is affixed to the base of the two interlocking units 12 located in the middle of said line abreast arrangement via securing elements 166. When in use, the sprinkler nozzle 16 is capable of discharging a spray of fluid (water, seawater or foam) that covers the four interlocking units 12 as illustrated by the broken lines.

In the event where aviation fuel or any other flammable liquid, which may be already burning, is dispersed on the landing surface 122 of the interlocking units 12, the sprinkler nozzle 16 discharges a spray of fluid, typically water, and flushes the flammable liquid down into the upper chamber 126 of the interlocking unit 12. This is possible since the flammable liquid (such as aviation fuel) is usually immiscible with water and can be washed through the openings 123 of the landing surface 122. Once within the upper chamber 126, the mixture of the flammable liquid and water contact the heat conductive layer 124. If the flammable liquid has been burning, the heat conductive layer 124 conducts the heat localized at the burning flammable liquid such that the heat is distributed across the entire heat conductive layer 124. The rapid distribution of heat reduces the temperature of the flammable liquid and allows the flames to be put out. Subsequently, the flammable liquid and the water used to flush said flammable liquid continue to flow into the lower chamber 128 where they may be collected and subjected to separation and purification methods for recycling purposes and/or safe disposal.

Figure 8A:
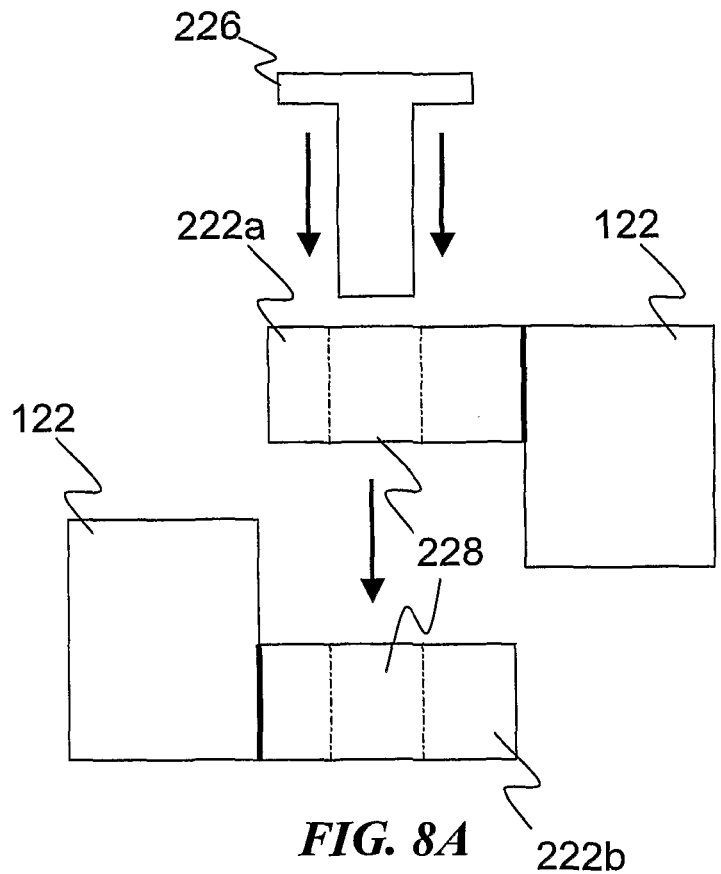
FIG. 8A and FIG. 8B are exemplary embodiments of interlocking mechanisms that may be fitted to the interlocking unit of FIG. 4.
Figure 8B:
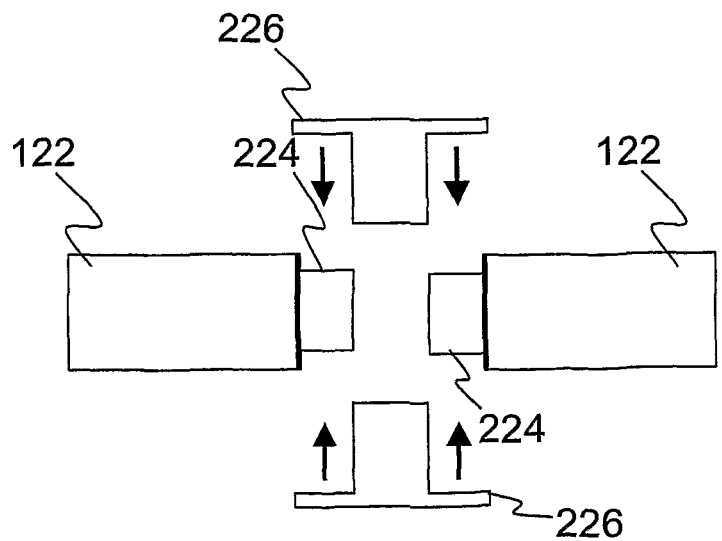

FIG. 8A and FIG. 8B are exemplary embodiments of interlocking mechanisms that may be fitted to the interlocking unit of FIG. 4. In FIG. 8A, the periphery of landing surfaces 122 of two respective interlocking units includes interlocking mechanisms 222a and 222b, respectively. Interlocking mechanism 222a and 222b are complimentary in shape to each other, i.e. when they are brought into contact with each other, they form a matching fit, that does not protrude into the landing surfaces 122. The two interlocking mechanisms 222a and 222b both include through-holes 228. As shown in FIG. 8A, when the interlocking mechanisms 222a and 222b are brought together to form a matching fit, the respective through-holes 228 form a single combined through-hole through which pin 226 can be threaded through to secure the interlocking mechanisms 222a and 222b together.

FIG. 8B illustrates another exemplary embodiment of an interlocking mechanism that may be used in conjunction with the landing pad. In this exemplary embodiment, the landing surfaces 122 each have identical interlocking mechanisms 224 attached to their periphery. The interlocking mechanisms 224 are brought into contact and are held in place by pins 226. It should be noted that the shape of the interlocking mechanisms 224 is adapted to accommodate the pins 226 such that there is no protrusion of the pins into the landing surface 122 of the interlocking units shown in FIG. 8B.

As mentioned earlier, the above description of the various exemplary embodiments of the present invention merely serve to aid in the understanding of the principle behind the invention. The present invention is not to be construed as being limited to the illustrated embodiments but rather, to the extent as defined in the claims that follow.

What is claimed is:

1. A landing pad with a built-in fire suppressor comprising:
   at least one first interlocking unit, said interlocking unit comprising:
   a landing surface, wherein the landing surface comprises: openings distributed thereon; and
      at least one interlocking mechanism located along its periphery, said interlocking mechanism being adapted to interconnect with a corresponding interlocking mechanism;
   an integrally formed hollow chamber located beneath the landing surface and in fluid communication with the openings, said hollow chamber being formed by a periphery wall surrounding the chamber, the landing surface and a base, and said periphery wall extending from the base to the periphery of the landing surface; and
   a heat conductive layer arranged to span continuously over an entire cross-sectional area of the hollow chamber so as to subdivide the integrally formed hollow chamber into a single upper hollow section and a single lower hollow section, wherein the single lower hollow section is in fluid communication with the single upper hollow section via the heat conductive layer, and wherein the heat conductive layer is adapted to dissipate heat from a localized point thereon to over the entire heat conductive layer, wherein the heat conductive layer is a finely meshed gauze, and the mesh size of the finely meshed gauze is adapted such that fluid dropping through the finely meshed gauze is atomized;
   wherein the heat conductive layer has an arcuated shape such that a center portion of the heat conductive layer is closer to the landing surface than a periphery portion of the heat conductive layer.

2. The landing pad of claim 1 wherein
   the mesh size of the finely meshed gauze is in the range of about 0.01 mm to about 2.5 mm.

3. The landing pad of claim 1, further comprising at least one sprinkler nozzle located proximate to the landing surface of the at least one first interlocking unit, wherein the sprinkler nozzle is connected to a fluid reservoir and said sprinkler nozzle is adapted to emit a spray of fluid over the entire landing surface.

4. The landing pad of claim 3, wherein the at least one sprinkler nozzle is integrally located within and substantially along the central axis or rotation of the at least one interlocking unit and extends up to the landing surface of said interlocking unit.

5. The landing pad of claim 3, wherein the at least one sprinkler nozzle is located adjacent to the periphery of at least two interlocking units such that the sprinkler nozzle is substantially equidistant from the centers of rotation of each of the respective at least two interlocking units and wherein that the sprinkler nozzle extends up to the landing surface of the respective interlocking units.

6. The landing pad of claim 1, further comprising at least one second interlocking unit, wherein the second interlocking unit is identical to the first interlocking unit, and interconnects with the interlocking mechanism of the first interlocking unit such that the landing surface of the at least one first interlocking unit and the landing surface of the at least one second interlocking unit combine to form an enlarged landing surface.

7. The landing pad of claim 1, further comprising a polygonal porous safety net arranged over the landing surface.

8. The landing pad of claim 1, wherein the single lower hollow section of the hollow chamber is adapted to collect and drain away fluid received from the landing surface via the heat conductive layer.

9. The landing pad of claim 1, wherein the gauze consists of a single layer.

10. The landing pad of claim 1, wherein the finely meshed gauze is fabricated from a heat conductive material.

11. The landing pad of claim 1, wherein the material is selected from a metal or a metal alloy.

12. The landing pad of claim 11, wherein the metal or metal alloy comprises copper, aluminum, or stainless steel stainless steel or aluminum.

13. The landing pad of claim 1, wherein the at least one first interlocking unit is fabricated from a metal.

14. The landing pad of claim 6, wherein the at least one second interlocking unit is fabricated from a metal.

15. The landing pad of claim 13, wherein the metal is selected from the group consisting of aluminum, titanium, stainless steel or alloys thereof.

16. The landing pad of claim 3, wherein the fluid in the fluid reservoir connected to the sprinkler nozzle is seawater, water or foam.

17. The landing pad of claim 3, wherein the sprinkler nozzle is secured to the underside of the landing surface.

18. The landing pad of claim 1, wherein the at least one interlocking mechanism located along the periphery of the landing surface is complementary in shape to the corresponding interlocking mechanism to which it is adapted to interconnect to.

19. The landing pad of claim 18, wherein the complementary shaped interlocking mechanism is adapted to receive and interconnect with the corresponding interlocking mechanism such that the landing surface remains planar.

20. The landing pad of claim 1, wherein said periphery wall is slanted such that an angle formed between the periphery wall and the landing surface is less than 90 degrees.

21. The landing pad of claim 2, wherein the gauze consists of a single layer that has a thickness of about 0.5 mm to 2.0 mm.

* * * * *